United States Patent [19]

Inagaki et al.

[11] Patent Number: 4,978,458
[45] Date of Patent: Dec. 18, 1990

[54] METHOD OF PURIFYING WATER FOR DRINK WITH SOLAR LIGHT AND HEAT AND APPARATUS USED FOR THE SAME METHOD

[76] Inventors: Jitsuo Inagaki, 71, Aza Kamiyashiki, Oaza Itsusiki, Itsusikicho, Hazugun, Aichi; Hisako Sawata, 562, Namiki 3-chome, Tsukuba-shi, Ibaragi, both of Japan

[21] Appl. No.: 346,646

[22] Filed: May 3, 1989

[30] Foreign Application Priority Data

Feb. 23, 1989 [JP] Japan ................................. 1-41847

[51] Int. Cl.⁵ ............................................. C02F 1/30
[52] U.S. Cl. ...................................... 210/748; 422/22
[58] Field of Search ............... 210/748, 764, 774, 900; 422/22, 24; 250/429, 435; 126/440

[56] References Cited

U.S. PATENT DOCUMENTS

| | | | |
|---|---|---|---|
| 1,599,481 | 9/1926 | Marcuse | 126/440 |
| 4,023,903 | 5/1977 | Scheib | 362/268 |
| 4,153,955 | 5/1979 | Hinterberger | 126/422 |
| 4,168,696 | 9/1979 | Kelly | 126/440 |
| 4,312,709 | 1/1982 | Stark et al. | 126/440 |
| 4,857,204 | 8/1989 | Joklik | 210/695 |

*Primary Examiner*—Peter Hruskoci
*Assistant Examiner*—Krisanne Shideler
*Attorney, Agent, or Firm*—Donald W. Hanson

[57] ABSTRACT

A method of purifying water by processing raw water with a high density light beam obtained by condensing solar light to obtain drinking water, and an apparatus for carrying out the same method, are disclosed.

The apparatus according to the invention comprises a light condenser for condensing solar light to obtain a high density light beam and a heat-resistant glass tube having a transparent section for passing original water through a portion corresponding to a focal point of the light condenser.

8 Claims, 3 Drawing Sheets

RAW WATER → | → TREATED WATER

METHOD OF PURIFYING WATER FOR DRINK WITH SOLAR LIGHT AND HEAT AND APPARATUS USED FOR THE SAME METHOD

BACKGROUND OF THE INVENTION

This invention relates to a method of purifying water to so as be suitable as drinking water a with high density light beam obtained by condensing solar light and the apparatus used for the same method.

Water in rivers, lakes and ponds is converted to drinking water by various methods such as a water purification plant system, a reverse osmosis system, an electrodialysis system, a freezing system, a distillation system (of a heating type or a pressure reduction type) and a boiling system.

The water purification plant system produces drinking water through precipitation in sand, followed by filtration and chlorine sterilization. This system requires a large amount of land and a high output water supply pump. In addition, the chlorine-based chemical which is introduced for the purpose of sterilization is liable to pose a problem of physical troubles due to the remaining chlorine component.

The reverse osmosis method is mainly utilized for converting sea water to fresh water. In this system, sea water is passed through an osmosis film with application of current to obtain fresh water. This system, however, requires a large-scale pressure application pump power as well as maintenance and renewal of the osmosis film.

The freezing system produces drinking water by overcooling water, separation by atomizing and then thermal dissolution. Again this system, however, requires great power. In addition, great cooling energy is necessary.

In the distillation system, water is evaporated by heating and then condensed by cooling to obtain drinking water. In the boiling system, material water is primarily filtered, then boiled and then secondarily filtered to obtain drinking water This system is simple compared to the systems noted above. However, for sterilization as a main step an conversion of water to drinking water, heating and temperature elevation of water which require heat of evaporation and great heat, are involved. Therefore, the heat energy consumption is increased, that is, the amount of final water produced is reduced with the same heat energy consumption.

Meanwhile, in the case of the supply of drinking water in tropical and subtropical regions, harmful bacteria and micro-organisms readily propagate in original water to be processed, and perpetual and strong caution of peccant bacteria causing endemic diseases is indispensable. There are fixed corruption and bacteria growth allowances for the quality of original water suited for the production of drinking water. Generally, it is not easy both technically and economically to convert water in rivers and lakes to drinking water, and there is no convenient and theoretically inexpensive means effective against high concentration bacteria and viruses as described above in connection with the prior art.

SUMMARY OF THE INVENTION

An object of the invention is to provide a water purifying method which requires reduced heat energy for elevating the water temperature, can effect sterilization without consuming heat of evaporation, permits decomposition of organic substances as well prevents deterioration of the quality of water after production and can convert water quality of river water to drinking water.

Another object of the invention is to provide an apparatus to be used for the method noted above.

According to one aspect of the present invention, there is provided a method of purifying raw water for drinking purposes, which comprises the steps of producing a high density light beam by converging solar light and effecting sterilization of original or raw water by exposure to said high density light beam.

According to another aspect of the present invention, there is provided a water cleaning apparatus, which comprises a light condenser for condensing solar light to a high density light beam and a heat-resistant glass pipe having a transparent section for permitting passage of original water at a focal point section of said light condenser.

These and other objects, features and advantages of the invention will be appreciated upon a review of the following description of the invention when taken in conjunction with the attached drawing with the understanding that some modifications, variations and changes may be easily accomplished by those skilled in the art to which the invention pertains without departing from the spirit of the invention or the scope of the claims appended thereto.

DETAILED DESCRIPTION OF THE PREFERRED EMBODIMENTS OF THE INVENTION

To attain the objects as noted above the inventors conducted extensive research and investigation to find that solar light, when condensed to a high density, can be a light beam capable of readily exterminating organisms and can also decompose organic substances. The invention is predicated in this finding.

More particularly, the present invention features condensing solar light to obtain a high density light beam and processing water by exposing it to the high density light beam to obtain water suitable as drinking water.

Further, the invention features an apparatus, which comprises a light condenser for condensing solar light to obtain a high density light beam and a heat-resisting glass tube having a transparent section for passing original or raw water through a focal point section of the light condenser.

Briefly, according to the invention solar light is condensed to obtain a high density light beam, which is used to effect sterilization and also decomposition of organic substances for preventing deterioration of the quality of water after production, while reducing heat energy for elevating water temperature and processing water in a method without consuming heat of evaporation to obtain drinking water. According to the invention, light absorption by impurities or bacteria which are readily capable of temperature rise takes place irrespective of the water temperature, so that the sole impurities and bacteria are elevated in temperature, thus permitting effective decomposition of the impurities and sterilization with high energy efficiency.

Now, preferred embodiments of the invention will now be described with reference to the drawings.

Figure 1:
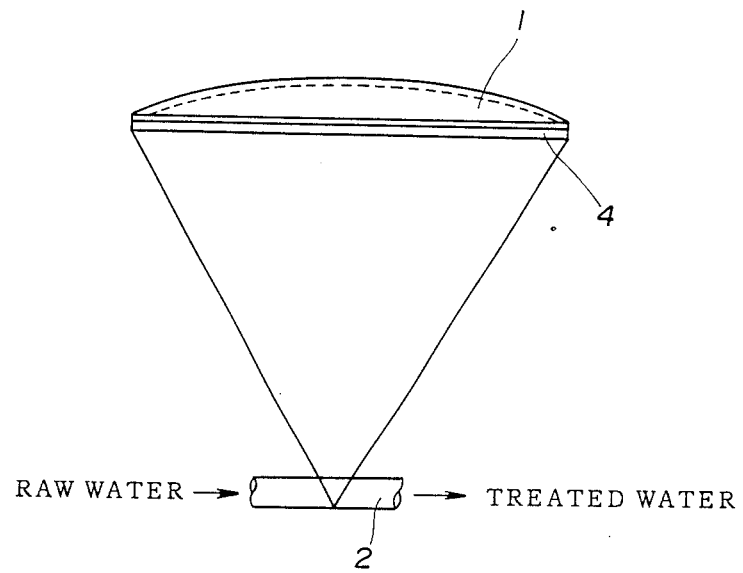
FIG. 1 is a schematic view showing an embodiment of the invention.

FIG. 1 is a schematic view showing an embodiment of the present invention. More specifically, the Figure shows an apparatus, which comprises a convex lens 1, a protective frame 4 fitted on the outer periphery of the lens 1 and a glass tube 2 for passing original or raw water.

The lens 1 may be a large-size convex lens, a Fresnel lens, etc. Further, it may be replaced with a different light condenser, for instance a reflector.

Figures 2A, 2B, 2C:
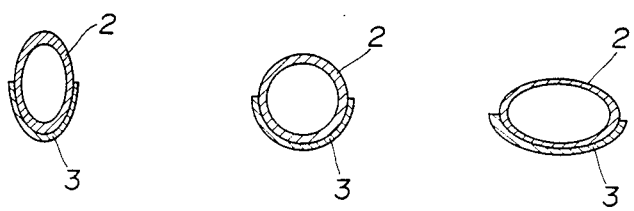
FIGS. 2(a) to 2(c) are sectional views showing a glass tube according to the invention.

The glass tube 2 suitably has a sectional profile conforming to the shape of the focal section. For example, its section may be longitudinally elongate oval as shown in FIG. 2(a), circular as shown in FIG. 2(b) or horizontally elongate oval as shown in FIG. 2(c).

Figure 3:
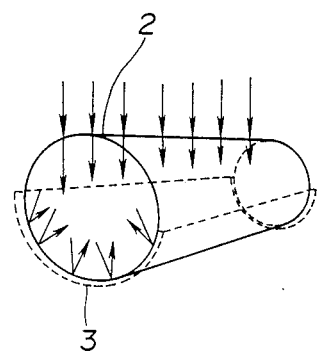
FIG. 3 is a perspective view showing the glass tube according to the invention.

The outer periphery of the glass tube 2 is formed with a surface 3 such as a mirror surface or white scattering surface formed with coating of a white paint, facing the light incidence axis, as shown in FIGS. 2 and 3.

Depending on the quality of the raw water, a simple primary filter, for instance a net or a sand filter, may be provided before the glass tube 2 to preliminarily remove large dust particles, and a simple secondary filter such as an active carbon filter may be provided after the sterilization/decomposition station to remove decomposed substances.

Figure 4:
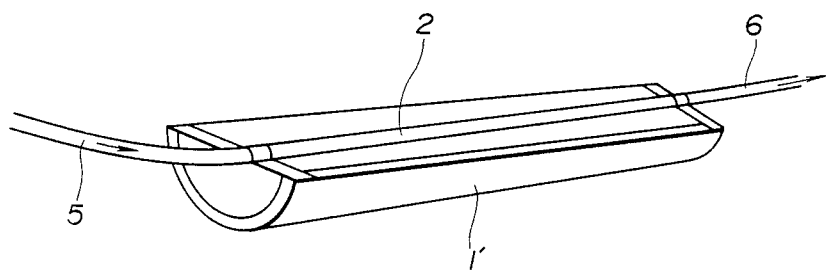
FIG. 4 is a schematic view showing a different embodiment of the invention.

FIG. 4 is a principal view showing an embodiment employed in a large-scale urban water purification plant. In this construction, a semi-cylindrical lens 1' is used to form a high density light beam over a long distance in a narrow glass tube 2. Raw water is introduced from an inlet tube 5 into the glass tube 2 to be processed by the high density light before being discharged through an outlet tube 6.

Now, an example of processing water using the apparatus according to the present invention will be described.

Raw water from a river, a lake, etc. is filtered by a filter and then passed through the glass tube 2. As the process water passes through the glass tube 2, microorganisms such as bacteria and viruses in it are instantly sterilized by a high density light beam, which has passed through the lenses 1 and 1' and reflected by white scattering surface 3. Thus, light absorption by impurities or bacteria readily capable of temperature rise takes place irrespective of the water temperature. Thus, decomposition of organic substances and sterilization are obtained effectively with high energy efficiency. The processed water obtained in this way is passed through the secondary filter before being supplied as drinking water. It was found that the processed water was free from micro-organisms such as bacteria and also from organic substances and met a standard for the drinking water.

On the earth, the solar furnace, which is theoretically capable of temperatures of 5,000° C. or above and actually 3,000° C. or above, is available. Thus, according to the present invention a condensed light beam which can heat bacteria and organic substances to about 1,000° C. can be comparatively readily obtained. Therefore, a suitable light beam density may be selected depending on the character of the raw water.

Further, the rate of flow through the glass tube is suitably determined according to the temperature to which bacteria are heated by the high density light beam, and concentrations of impurities and bacteria in raw water. When these concentrations are high, the light absorption is correspondingly high, so that there is no need of large-scale control depending on the kind of the raw water.

Figure 5:
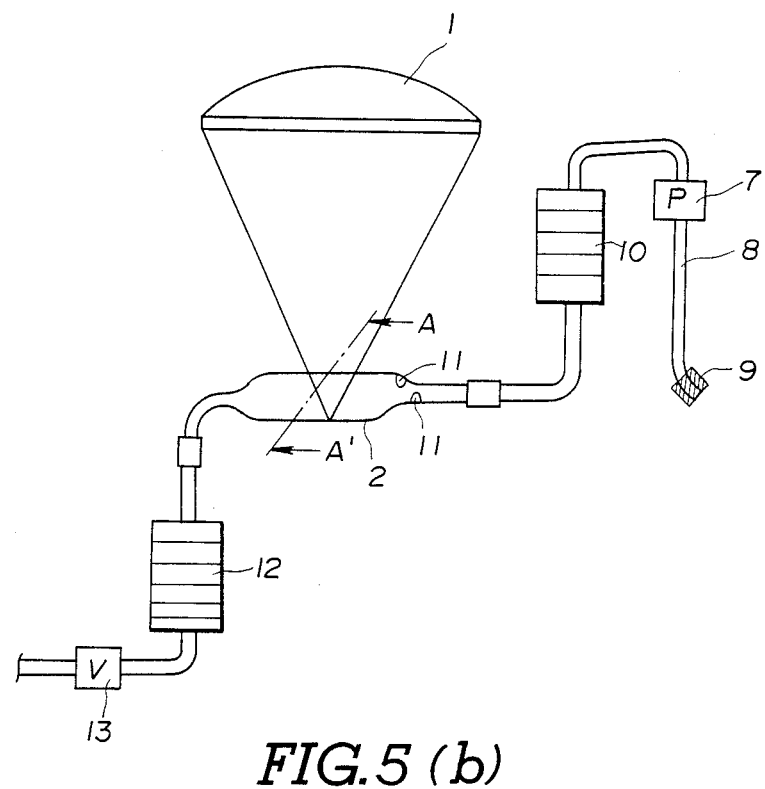
FIG. 5(a) is a schematic view showing a further embodiment of the invention.
FIG. 5(b) is a sectional view taken along line A—A' shown in FIG. 5.
Figure 5:
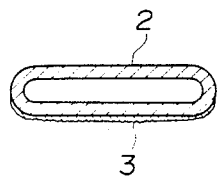

FIGS. 5(a) and 5(b) are schematic views showing a different embodiment of the present invention. The raw water, for instance river water, is withdrawn by a pump 7. At this time, large dust particles are removed by a net 9 mounted on an end of a pipe 8. The withdrawn raw water is filtered through a primary filter tank 10 and then introduced into a Pyrex brand glass tube 2. In the primary filter tank 10, a plurality fabric layers or sand and gravel layers are laminated. This filter tank mainly serves to remove corruption of the raw water. When corruption of the water is removed in this way, the sterilization in the glass tube 2 by the high density light beam can be attained effectively. If there is corruption, it will mask bacteria, so that it is liable to result in failure of complete sterilization of bacteria. At the inlet of the glass tube 2, turbulent flow promotion projections 11 are formed. By promoting turbulent flow in this way, i.e., with the projections 11, the raw water flows through the glass tube 2 in an agitated state, and this has an effect of providing a more uniform condition for sterilization. As the raw water passes through the glass tube 2, bacteria, viruses and like micro-organisms are instantly sterilized by the high density light beam having passed through the lens 1 and reflected by the white scattering surface 3. Also, organic substances are decomposed. The raw water, which has been subjected to the sterilization process in the above way, is further filtered through a secondary filter tank 12, and the filtrate therefrom is passed through an open valve 13 and supplied as clean drinking water.

As has been described in the foregoing, according to the invention, a high density light beam obtained from polution-free and inexhaustible solar energy is used to instantly sterilize micro-organisms and decompose organic substances to obtain water suited as drinking water. Thus, no energy consumption expenditure is need, so that it is possible to provide broadly very economical techniques, which greatly contributes to the benefit of many people in the world who drink water indirectly in rivers, lakes, etc.

What is claimed is:

1. A method of purifying raw water for drinking purposes comprising the steps of condensing solar light with a refractor having a focal point to obtain a high density light beam and passing the raw water through a heat resistant glass tube having a transparent section located at the focal point of the refractor, and a mirrored or white scattering surface facing a light incident axis, while passing the light beam through the transparent section of the glass tube and reflecting it off the mirrored or white scattering surface so as to expose the raw water to said high density light beam for sterilization of the raw water.

2. A method of purifying raw water for drinking purposes in accordance with claim 1 wherein said light refractor is a large size convex lens.

3. A method of purifying raw water for drinking purposes in accordance with claim 1 wherein said light refractor is a Fresnel lens.

4. A method of purifying raw water for drinking purposes in accordance with claim 1 wherein said glass tube has a white scattering surface facing a light incidence axis of said light refractor.

5. A method of purifying raw water for drinking purposes in accordance with claim 4 wherein said white scattering surface includes a coating of white paint.

6. A method of purifying raw water for drinking purposes in accordance with claim 1 wherein said glass tube has a mirror surface facing light incidence axis of said light condenser.

7. A method of purifying raw water for drinking purposes in accordance with claim 1 further including the step of filtering the raw water prior to exposing the water to said high density light beam.

8. A method of purifying raw water for drinking purposes in accordance with claim 7 further including the step of filtering the water after exposure of the water to said high density light beam.

* * * * *